Patented Aug. 3, 1954

2,685,519

UNITED STATES PATENT OFFICE 2,685,519

PROCESS FOR MAKING A PEANUT PRODUCT

Harold W. Moore, Concord, Calif.

No Drawing. Application May 29, 1952,
Serial No. 290,813

5 Claims. (Cl. 99—126)

This invention relates to a novel article of food and particularly relates to a new food product made from peanuts.

It is an object of the present invention to prepare a novel peanut product in the form of a wafer or chip which is attractive in appearance and which is adapted to be sold and dispensed in packages such as those used for packaged nuts, potato chips, corn chips, and the like.

The invention includes other objects and features of advantage some of which together with the foregoing will be described hereafter.

In general, I accomplish the objects of my invention by grinding raw peanuts, making the peanuts into a dough by the addition of water, rolling or otherwise shaping the dough into a flat body, and cooking the same.

In carrying out my invention, the first step is to grinding raw shelled peanuts. Although the peanuts can be ground to any degree of fineness, I prefer to grind the peanuts to a coarse grind wherein particles of appreciable size remain in the ground mixture. I have found that if the peanuts are ground extremely fine, the finished product has a taste resembling peanut butter, while if the grind is relatively coarse, the finished product tastes substantially like roasted peanuts. I prefer to grind the peanuts in a mill of the type ordinarily used for grinding cornmeal. One such mill consists of two metal discs, one of which is revolved relative to the other; the peanuts are fed in the center and are forced out between the two plates. At least one of the plates contains a series of radial grooves. When ground through such a mill, the peanut meal contains particles of varied sizes, many of the particles being as large as $\frac{1}{16}$ inch, with a few particles even as large as $\frac{1}{4}$ inch. In both instances, measurements refer to the longest dimension of an irregularly shaped particle. Of course, there are many fine particles in such a meal and the fine particles act as a binder.

To one pound of ground raw peanuts, about six ounces of water is added to form a dough. The dough is kneaded to uniform consistency and is then formed into pieces of the desired size. One convenient way of doing this is to place the dough in a cookie press and extrude it into strips. Of course, the thickness of the strips must be at least as great as the largest particles which occur in the dough. Ordinarily a cookie press is used which has a slot of about $\frac{1}{16}$ inch in thickness. Since the particles are ordinarily irregularly shaped, particles having one dimension considerably larger than $\frac{1}{16}$ inch can pass through such a press. The press may have serrated edges, which gives the product an attractive grooved appearance.

Alternatively, the dough may be rolled into strips using an ordinary roller and the strips cut into pieces of convenient size.

After the dough has been formed into pieces of the desired dimensions, it is then placed in an oven and cooked. In a 200° F. oven, the cooking time will be about one hour, although shorter or longer periods of time may be used, depending upon the heat of the oven and the degree to which one desires to cook the product.

Instead of cooking the peanut product in an oven, it may be fried in deep fat. Ordinarily, a few seconds are sufficient to cook the product when it is cooked in this manner.

After cooking, the product may be salted, if desired, by sprinkling salt over one side of the finished chip.

A product made in this way has an attractive appearance and feel, yet it retains substantially the same taste as roasted salted peanuts.

When the dough is formed, other products may be added thereto such as wheat flour, soya bean flour, whole wheat flour, wheat germ, and the like. However, it is preferred not to add such ingredients since these detract from the peanut taste. However, in many instances, this is not considered a disadvantage and such other materials may be added advantageously.

I claim:

1. A process of making novel peanut product comprising grinding shelled raw peanuts, adding water only thereto to make a dough consisting only of water and ground raw peanuts, forming the dough into thin pieces and cooking the pieces.

2. The process of claim 1 in which the peanuts are ground in such a manner as to leave a number of large chunks of peanut in the mixture.

3. The process of claim 1 wherein the cooking is conducted by placing the product in an oven and baking the same.

4. The process of claim 1 wherein the product is cooked by frying in deep fat.

5. The process of preparing a peanut product comprising coarse grinding one pound of raw shelled peanuts, adding thereto about six ounces of water to make a dough, forming the dough into flat pieces, and cooking the pieces in an oven at 200° F. for about one hour.

References Cited in the file of this patent

UNITED STATES PATENTS

| Number | Name | Date |
|---|---|---|
| 306,727 | Edson | Oct. 21, 1884 |
| 1,063,208 | Norton | June 3, 1913 |
| 2,068,051 | Canton et al. | Jan. 19, 1937 |

OTHER REFERENCES

"Nuts and Ways to Use Them," Miscellaneous Publication No. 302, U. S. Dept. of Agriculture, Wash., D. C., issued February, 1938, pages 3–5.

"Everybody's Cook Book" by Lord, Revised Edition, Harcourt, Brace and Company, New York, pages 163 and 580.